No. 722,487. PATENTED MAR. 10, 1903.
W. W. BURSON.
CORN HARVESTER.
APPLICATION FILED DEC. 13, 1895.
NO MODEL. 5 SHEETS—SHEET 5.
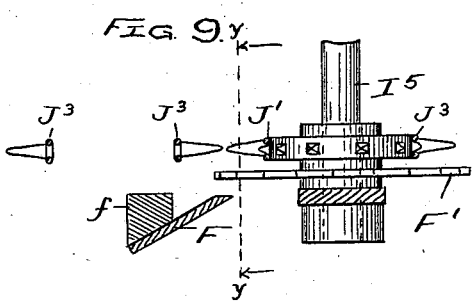
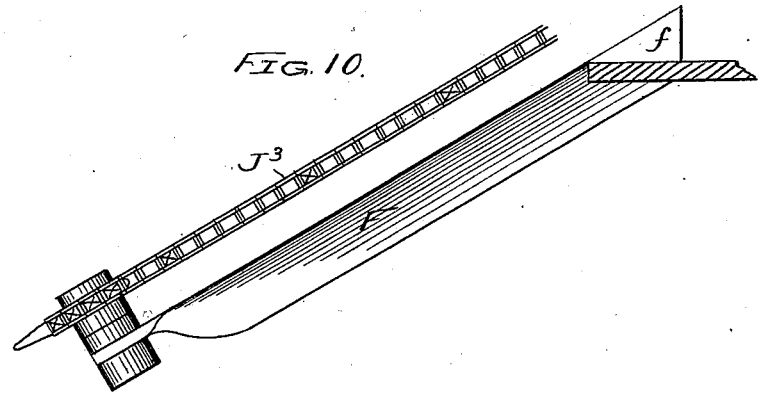
WITNESSES: INVENTOR:

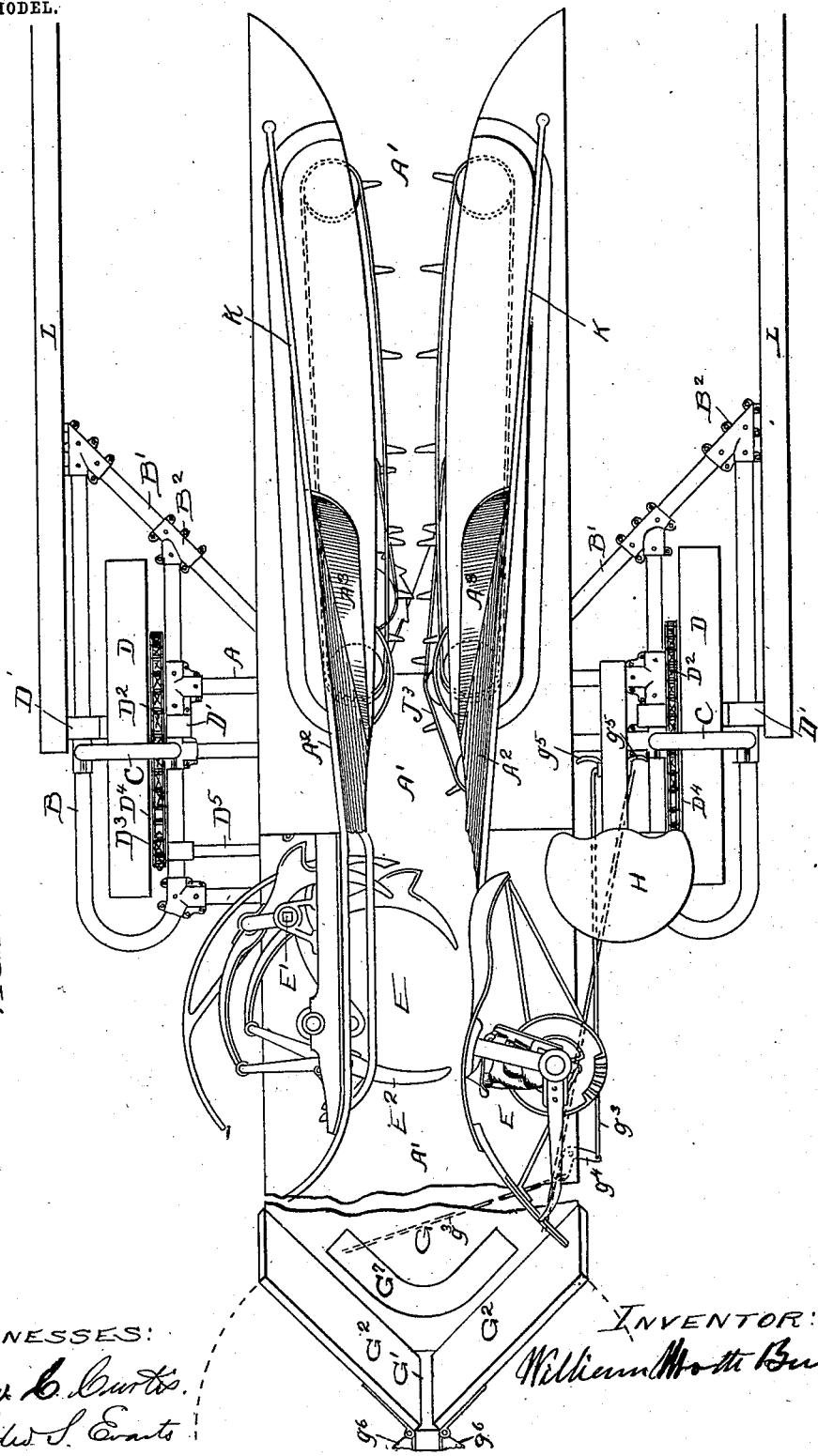

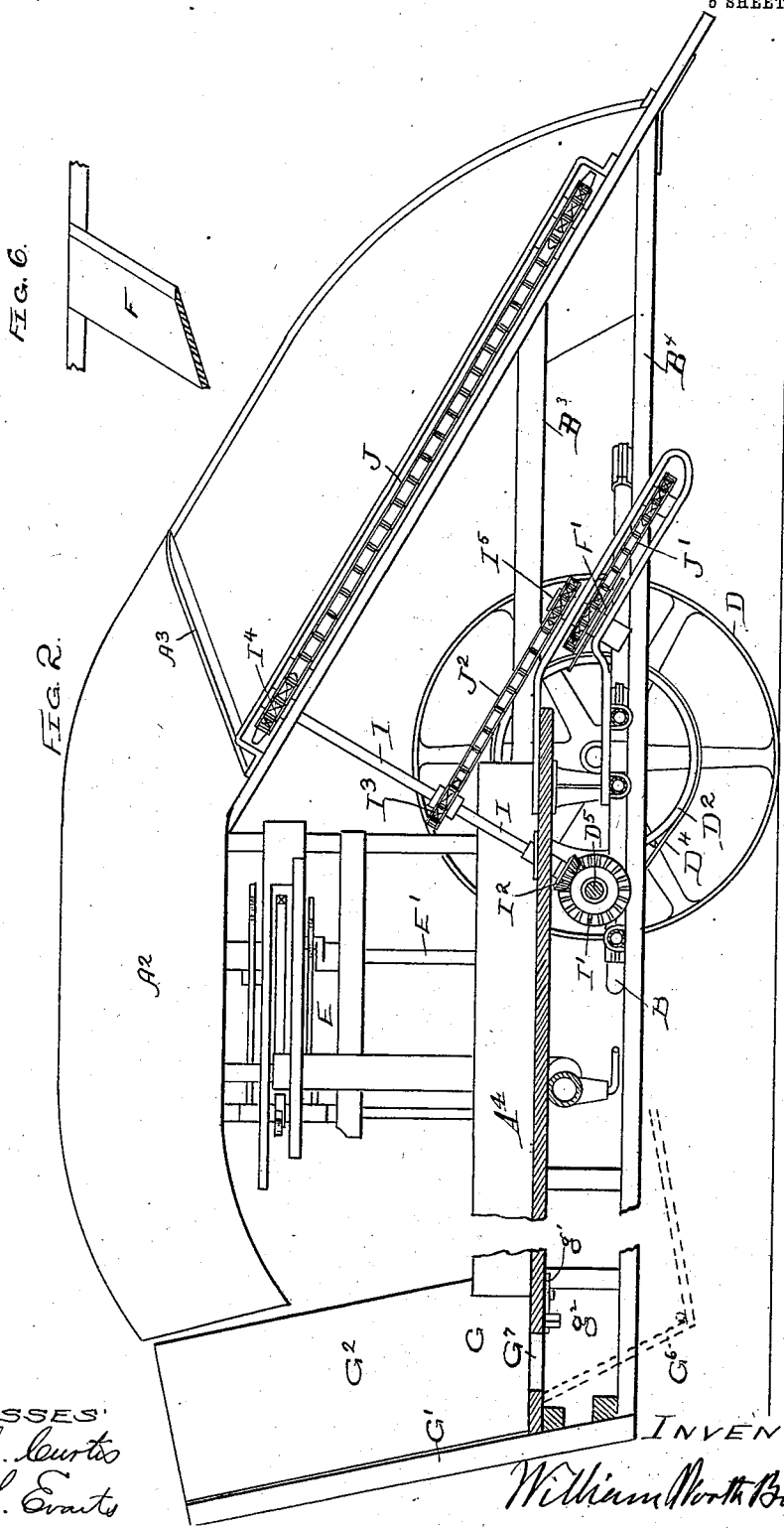

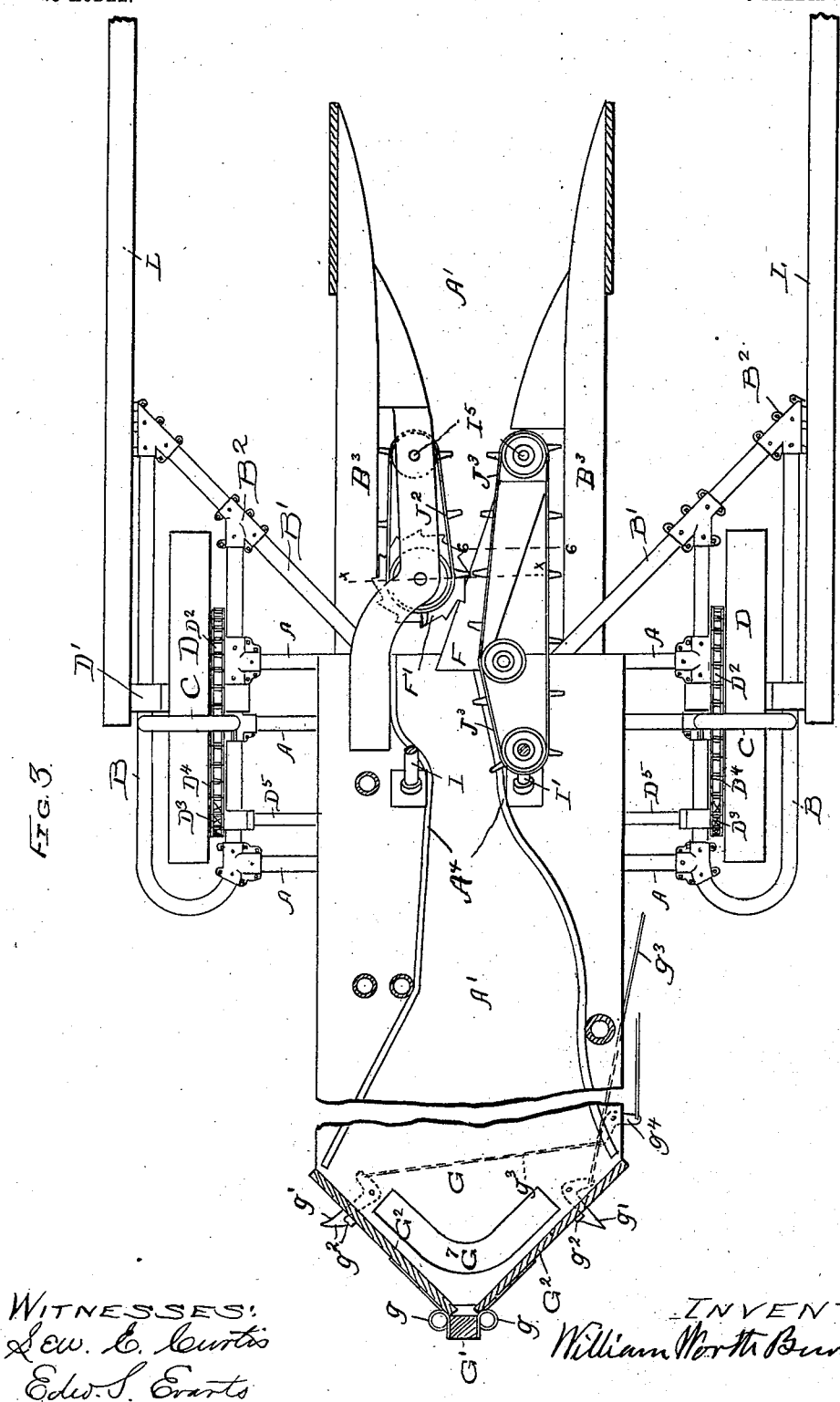

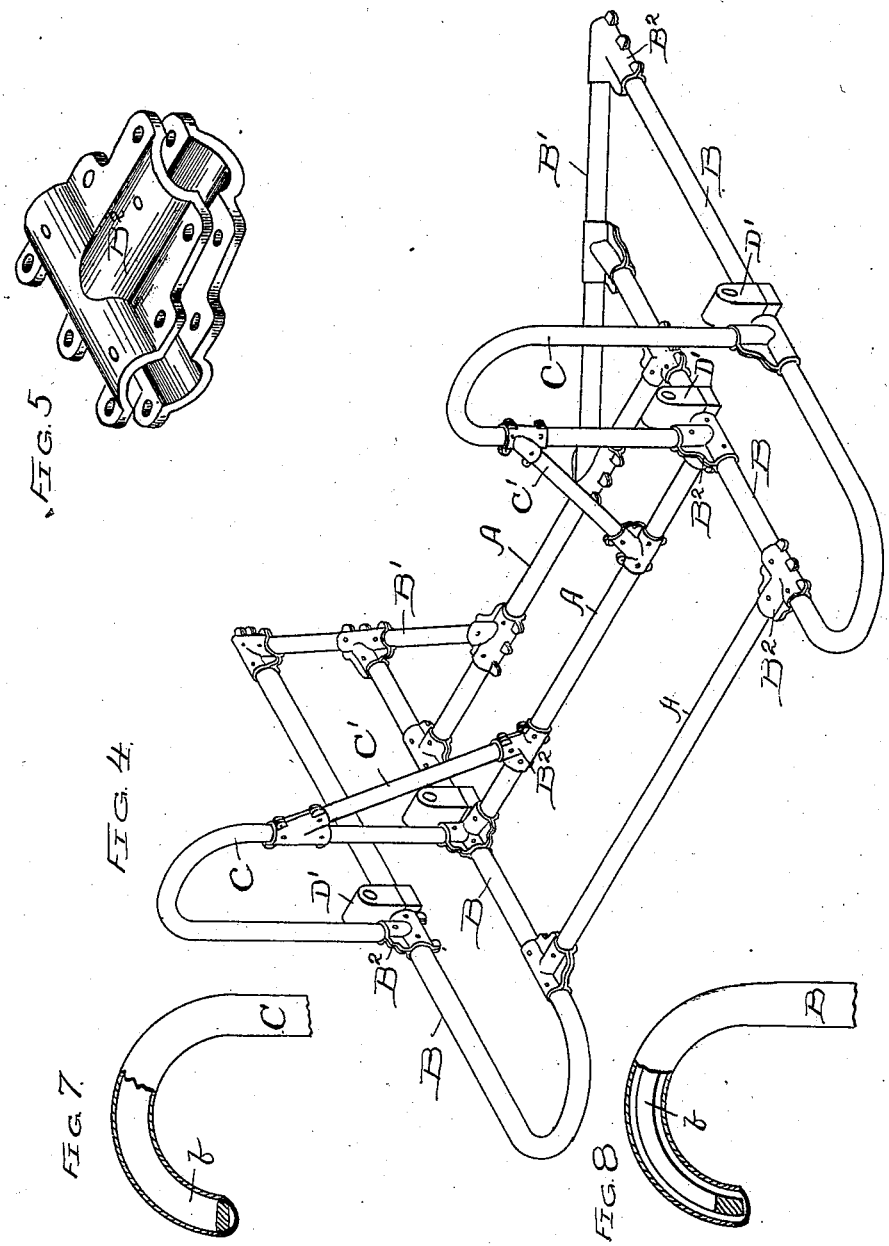

UNITED STATES PATENT OFFICE.

WILLIAM WORTH BURSON, OF CHICAGO, ILLINOIS.

CORN-HARVESTER.

SPECIFICATION forming part of Letters Patent No. 722,487, dated March 10, 1903.

Application filed December 13, 1895. Serial No. 572,027. (No model.)

*To all whom it may concern:*

Be it known that I, WILLIAM WORTH BURSON, a citizen of the United States, residing at Chicago, in the county of Cook and State of Illinois, have invented certain new and useful Improvements in Corn-Harvesters, of which the following is a specification.

My invention relates to the gathering, cutting, binding, and delivering of the bundles in windrows upon the ground and in saving the ears broken off the stalks in these operations from being scattered upon the ground.

The objects of my invention are, first, to provide an improved frame for the machine; second, to provide an improved cutting apparatus; third, to provide an improved stalk-gathering mechanism; fourth, to provide an improved carrying and dumping device for the bound bundles; fifth, to provide means for saving the ears broken from the stalks in the process of cutting and binding from being scattered upon the ground. These objects are attained by the mechanism illustrated in the accompanying drawings, in which—

Figure 1 is a plan view of the machine, a part of the glancing-boards $A^2$ being removed to permit of a better view of the binder and other parts. Fig. 2 is a side elevation on a central section. Fig. 3 is a plan, certain parts being removed. Fig. 4 shows the frame. Fig. 5 shows the coupling $B^2$. Fig. 6 shows a section of the knife F. Figs. 7 and 8 show the bent pipe with the strengthening-piece $b$ inside. Fig. 9 shows a section of Fig. 3 on the line $x\, x$. Fig. 10 shows a section of Fig. 9 on the line $y\, y$.

Similar letters of reference denote the same parts throughout the several views.

The harvester-frame is made, preferably, of steel tubing, as this form of material gives the greatest strength for a given amount of material, and the form of the several parts and their arrangement is such as to give a maximum of stiffness and strength for a minimum of weight. The frame, Fig. 4, briefly described, consists of a series of horizontal cross-pieces A A A, fastened to the inner part of the two U-shaped horizontal pieces B by the couplings $B^2$. These U-shaped pieces B are bent at the rear with sufficient opening to admit the carrying-wheels D D between their parts, and their forward ends are fastened together by the inclined braces B', joining them to the front cross-piece A. Two additional U-shaped pieces C C are arranged vertically and have their lower ends fastened to the pieces B near the axis of the carrying-wheels, the bent ends extending over the wheels. A brace-piece C' has its upper end fastened near the upper end of each piece C and its lower end fastened in a bracing position to one of the cross-pieces A, giving additional stiffness to the frame. It is well known that a pipe is weakened at the bend, and to overcome this defect, as also to give the U-shaped pieces additional strength in the bent part, a flat rectangular bar $b$ is inserted in the pipe before bending and bent with the pipe, the flat bar being so placed as to give its greatest strength in the direction of the greatest strain. The couplings $B^2$ are made in two pieces and of such shape as to hold the two pipes in each case in proper position. The couplings may be cast of gray iron or malleable iron or made of sheet metal and pressed into the proper shape. It is the function of these couplings to hold both pipes positively firm and rigid and to add strength to the pipes at the union instead of weakening them, as is done with the usual connection. The form of these couplings gives opportunity to insert any desired iron-cement between them and the pipes to increase the grip of such couplings upon the pipes when desired. To this steel frame the horizontal pieces $B^3$ and $B^4$ are secured, as best shown in Figs. 2 and 3, and such other minor parts as may be wanted, the particulars of which it is not thought necessary to point out in detail.

The harvester is supported on two carrying-wheels D D, preferably each turning on a shaft held by the supports D', which are fastened to the pieces B, as shown in Fig. 4. A sprocket-wheel $D^2$ is secured to the inner side of each wheel D, and by means of chain $D^4$, extending over sprocket-wheels $D^3$ on opposite ends of a shaft $D^5$, gives motion through bevel-gear I' on the cross-shaft $D^5$ to bevel-pinion $I^2$ on the lower end of the inclined shaft I, on which are the sprocket-wheels $I^3$ and $I^4$. The sprocket-wheel $I^4$ at the upper end of the shaft gives motion to the upper gathering-chain J, and the sprocket-wheel $I^3$ gives motion to the rear lower gathering-chain J² and also by means of a sprocket-wheel on the short inclined shaft I⁵ turns the gathering-wheel F', which is rigid on said shaft, and also the front lower gathering-chain J' through another sprocket-wheel fastened to said shaft I⁵. Chain J⁸ is driven by the sprocket-wheel on shaft I', which shaft is driven, as already described for its mate I, by similar connection with shaft D⁵. The binder E receives its motion from a connection between the shaft D⁵ and the packer-shaft E' in any convenient manner, as is well understood.

By reference to Fig. 1 it will be seen that there is a stalk-passage A' extending from the front end of the gathering-points K K backward to the knife F and gathering-wheel F' and continues rearward to the binder E and the trip E², which of course gives way to the passage of the stalks and bundles at the proper time, leaving practically a free passage to the bundle-receiver G. It should be noted that the knife F, which is fastened to the frame on one side of the stalk-passage, extends rearward from its tangential approach to the gathering-wheel F', which is placed on the other side of the passage and at sufficient height above the knife to permit grasses and pliable weeds to pass through uncut, as best shown in Fig. 9. It will also be seen that there is an open space at the rearward side of said gathering-wheel (see Fig. 3) and that the action of the gathering-wheel and of the inclined position of the knife F tends to separate the uncut grasses and weeds from the cut stalks and to bend them down, so that the harvester may pass over them without risk of clogging. Since these grasses and weeds have no value as fodder, this disposition of them is preferred to that adopted by those manufacturers who cut them with a reciprocating cutter at a considerable expense in machinery and of power to operate it. The upward inclination of the edge of the knife F forms a sort of groove in connection with the sill f and the chain J³, Figs. 9 and 10, in which the lower end of the cut stalks may move while being conveyed rearward, and, moreover, gives a glancing cut upon the stalks.

The binder E may be of any approved type and is here shown as placed substantially on end, adapted to bind the stalks in an upright position; but any inclination desired may be given to it, either rearwardly or sidewise, the other parts being adapted to the change, and the operation will be successful.

At the rear end of the stalk-passage A' is the bundle-receiver G. As here shown, it consists, substantially, of a vertical central post G', to which are hinged on either side the wings or gates G² G², which are returned into receiving positions by the springs g and held closed by the hooks g', pivoted on the frame, engaging the studs g² on the lower end of wings. These retaining-hooks are conveniently released by flexible connections of wire or cord g³, extending when necessary through the right-angled lever g⁴ to the foot-levers g⁵, convenient to the driver's seat H. The object of this construction is to enable the driver from his seat to discharge the bundles stubbleward while cutting back and forth on one side of the field without regard to the direction the machine may be traveling. Any other construction of the bundle-receiver which permits it to open stubbleward and leaves the side next to the standing corn closed without regard to the direction in which the harvester is moving will accomplish the same result. It is necessary to deliver the bundles out of the way of the team in cutting the next row, and the construction of the wings G² and stops g⁶ is such as to form a glancing mechanism adapted to accomplish this result without the aid of stationary inclined rods or other devices.

The upper and lower gathering-chains J J² receive their movement direct from shaft I, and the forward lower gathering-chain J' receives its motion indirect from the same shaft, which is moved by shaft D⁵, as already explained. These gathering-chains may be of any approved form, the object being to properly present and hold the stalks to the cutting apparatus and to deliver the cut stalks to the binder.

In cutting corn it is very desirable to save the ears which are broken from the stalks in the operation of cutting and binding and to collect and carry said ears to piles or to deliver them at the will of the driver in the windrows with the bundles instead of having them scattered over the field, as is the present practice. For this purpose the stalk-passage has inclined side pieces A², extending rearward from a point above and somewhat in advance of the cutting apparatus above the end of the chain J backward to the bundle-receiver, adapted to save the ears broken off in the operation of cutting and binding from falling to the ground and to deliver them on the binding-platform. The inclined troughs A³ A³ are fastened on the side pieces A² A², somewhat forward of the cutting apparatus, and extending rearward and downward assist in saving the ears broken off previous to the operation of cutting the stalks from falling down in the open stalk-passage by guiding them rearward to that part of the stalk-passage which has a closed bottom. Side pieces A⁴ A⁴ are placed on the platform, one on each side of the stalk-passage, to form a trough adapted to hold the broken-off ears and to cause them to be moved rearward to the bundle-receiver with the stalks and bundles. At the rear end of the stalk-passage and under the platform is placed the receiving-box G⁶. (Shown in dotted lines in Fig. 2.) It has a hinged bottom, and the ears fall into it through an opening G⁷ in the platform large enough to freely admit them, but not large enough to interfere with the passage of the bundles over said opening. By means of this box the broken-off ears are saved and carried and dumped in piles at the will of the driver. When this receiving-box is not used, the broken-off ears are delivered in the windrows and gathered to the shocks with little labor as compared with that required to gather them when scattered over the field.

In operation the machine as here constructed is drawn astride a row of corn, the team walking inside of the tongues L L, as is well understood. The gathering-chains J J² and guide-rods K K insure the stalks being brought against the knife F, which on account of its inclined position easily cuts them off, and they are passed rearward along the stalk-passage to the binder E, where they are bound and passed to the bundle-receiver G. When a sufficient number have accumulated, the driver from his seat H touches the proper pedal $g^5$, which detaches hook $g'$ and permits the wing G² to swing downward and rearward to stop $g^6$ under the weight of the bundles, whereby the inclined shape of the receiver permits the bundles to slide stubbleward out of the path of the team in cutting the next row, no matter which way it may be going. It should be noted that the wings G² are arrested in their rearward movement by the stop $g^6$, which leaves them in a rearwardly-inclined position, and thus the bundles are left farther stubbleward than if they were dropped directly down. In the operation just described the broken-off ears are moved backward upon the platform by the action of the butts of the stalks or otherwise and either caught in the box G⁶ when it is used or thrown off with the bundles in the windrow when the gathering-box is not used. Attention is invited to the nearly upright position of the bundle-receiver, which construction permits the long bundles to be carried free from contact with the stubbles or side obstruction as when carried horizontal extending outward from the line of travel and with less tendency toward unbalancing the machine than when extending horizontal rearward.

Various modifications may be made in the aforedescribed devices without departing from the scope of my invention.

What I claim as my invention, and desire to secure by Letters Patent, is—

1. In a corn-harvester, the combination of horizontal bent pieces B, B, extending forward at each side of the machine and each having two members inclosing the wheels between them, one or more cross-pieces A uniting the inner members of the two bent pieces together, brace-pieces B', B' uniting the front cross-bar A to the front ends of the bent pieces, and the couplings B².

2. In a corn-harvester, the combination of horizontal bent pieces B, B, extending forward at each side of the machine and each having two members inclosing the wheels between them, vertical bent pieces C, C, extending over the top of the wheels and uniting the members of each bent piece together and one or more cross-pieces A uniting the inner members of the bent pieces together, and couplings B².

3. In a corn-harvester, the combination of horizontal bent pieces B, B, extending forward at each side of the machine and each having two members inclosing the wheels between them, vertical bent pieces C, C, extending over the top of the wheels, one or more cross-pieces A uniting the inner members of the two bent pieces together, and diagonal vertical braces C', C' connecting the pieces C, C to the bent pieces B, B.

4. In a corn-harvester, the combination of a stalk-passage, a revolving gathering-wheel on one side of the passage, a gathering-chain and a stationary knife on the other side of said passage, said knife being inclined upwardly toward its rear end, whereby the stalks are held to the knife and cut with a glancing movement, and the cutting edge of the knife being located below the chain, whereby the butts of the stalks are adapted to pass into the space between the knife and gathering-chain.

5. In a corn-harvester, the combination of a cutting mechanism to sever the stalks, a vertical binding mechanism to bind them in bundles, and a vertical receiver located centrally at the rear of the stalk-passage and provided with rearwardly-swinging doors on opposite sides to allow the grain to be delivered in windrows on either side.

6. In a corn-harvester, the combination of the stalk-passage, a gathering mechanism along said passage, a cutting mechanism to sever the stalks, a vertical binding mechanism to bind the stalks into bundles, and a vertical bundle-receiver to take the bundles from the binder and hold them in upright position, said receiver being provided with gates or doors on opposite sides operatable at the will of the driver to deliver the grain on either side.

7. In a corn-harvester, the combination of a cutting mechanism, a binding mechanism, a bundle-receiver, and means for opening and closing either side of said receiver to discharge the bundles at the will of the driver on either side of the stalk-row being cut.

8. In a corn-harvester, the combination of a cutting mechanism adapted to sever the stalks, a receiver adapted to receive the severed stalks, and means for opening and closing either side of said receiver to discharge the stalks in windrows on either side of the row being cut.

9. In a corn-harvester, the combination of a cutting mechanism, a binding mechanism, a bundle-receiver provided with a central support, and a hinged wing or gate on each side of said central support, either of said wings or gates being releasable at the will of the driver, whereby the bundles may be carried and delivered in windrows stubbleward at the will of the driver.

10. In a corn-harvester, the combination of a cutting mechanism, a closed platform back of the cutting mechanism, a binding mechanism, a bundle-receiver, and inclined boards at the sides of the stalk-passage provided with cleats or chutes extending rearward from a point in advance of the cutting mechanism, whereby the ears broken from the stalks may be directed onto the platform.

11. In a corn-harvester, the combination of a stalk-passage, a gathering mechanism arranged along the side of the passage, a cutting mechanism, a stalk-receiver at the rear of the passage, inclined gathering side pieces adapted to prevent the broken-off ears from falling to the ground, the inclined chutes $A^3$, $A^3$, on said inclined gathering side pieces, and a closed platform back of the cutting mechanism adapted to receive the ears broken off before reaching the binder.

12. In a corn-harvester, the combination of mechanism for gathering and cutting the stalks, a platform in rear of the cutting mechanism, upwardly-extending boards $A^4$ at the sides of the platform, a binding mechanism, and downwardly and inwardly inclined boards above and at the sides of the cutting, gathering and binding mechanisms for directing the ears that are broken from the stalks onto the platform.

13. In a corn-harvester, the combination of mechanism for gathering and cutting the stalks, a platform in rear of the cutting mechanism, upwardly-extending boards $A^4$ at the sides of the platform, a binding mechanism, a bundle-receiver in rear of the binding mechanism, and downwardly and inwardly inclined boards above and at the sides of the cutting, gathering and binding mechanisms, whereby the broken-off ears will be held in line with the stalk movement and guided onto the platform.

14. In a corn-harvester, the combination of a cutting mechanism, a closed platform in rear of said cutting mechanism, inclined side pieces forming a passage-way for the stalks and broken-off ears, inclined boards placed along the stalk-passage to gather the ears broken off in the operation of cutting and binding the stalks and to deliver them on the platform, a binding mechanism, and a bundle-receiver, whereby the bound bundles and the broken-off ears may be delivered upon the ground at the will of the driver.

WILLIAM WORTH BURSON.

Witnesses:
 N. LAMB,
 H. B. ANDREWS.